April 28, 1959     E. J. DIEBOLD     2,884,583
SIX PHASE HALF WAVE MECHANICAL RECTIFIER
Filed June 15, 1953
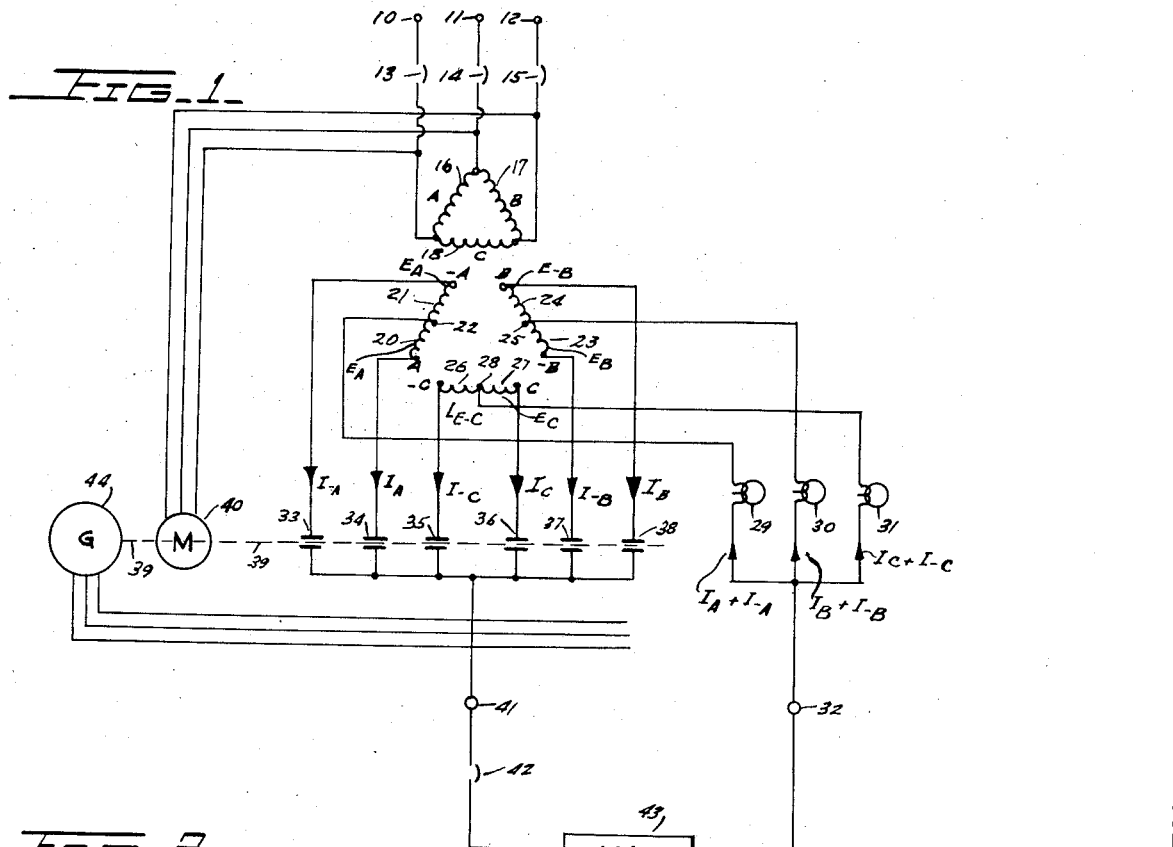
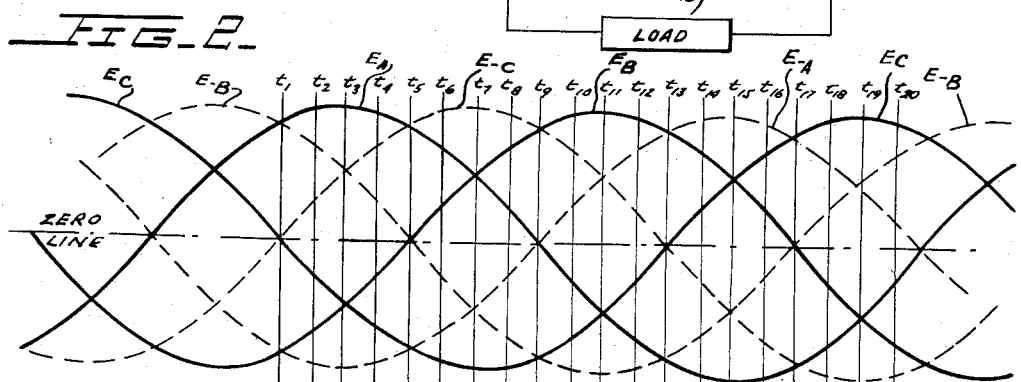
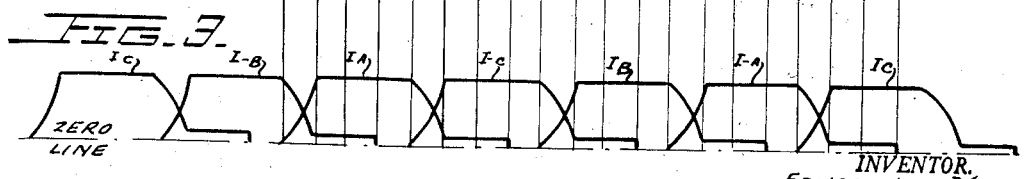
INVENTOR.
EDWARD JOHN DIEBOLD
BY
ATTORNEYS

United States Patent Office 2,884,583
Patented Apr. 28, 1959

2,884,583
SIX PHASE HALF WAVE MECHANICAL RECTIFIER

Edward John Diebold, Ardmore, Pa., assignor to I-T-E Circuit Breaker Company, Philadelphia, Pa.

Application June 15, 1953, Serial No. 361,669

5 Claims. (Cl. 321—48)

My invention relates to medium voltage medium current rectifiers and is more particularly directed to a six phase half wave mechanical rectifier.

The following three problems are encountered in the design of medium voltage medium current rectifiers.

(1) Making a mechanical rectifier in which the contacts carry no more effective current than used previously yet increase the rate of output current.

(2) For a mechanical rectifier with an appreciable output voltage reduce the size and the number of the elements which depends upon the voltage for which they are built.

(3) Keep the rate of rise of the voltage across the contacts of the mechanical rectifier at a low value although the output voltage might be high.

The circuit of the invention is a so-called one wave circuit as compared to previously known art which considered only two wave circuits. The advantage of the one wave circuit has been described in my copending application Serial No. 361,670, filed June 15, 1953, now Patent No. 2,811,687.

The output current is higher for a fixed number of contacts since all contacts contribute to the output current in parallel instead of the current flowing through only one contact from the rectifier to the load and back through two contacts in series as it is required with the two wave circuits.

The circuit requires six contacts for the mechanical rectifier and only three commutating reactors, these three commutating reactors being used twice over in each cycle. This means that the expense for commutating reactors can be held very low.

The circuitry shown in my copending application Serial No. 361,670, filed June 15, 1953, is especially suitable for low voltage rectifiers whereas the circuit of my instant invention is especially suitable for medium voltages. Low voltage rectifiers incur expense for the components which must handle high currents such as bus bars, short circuiters, circuit breakers and all the auxiliaries thereof, whereas the expense for equipment which depends on voltage, that is, the power transformer, the intra-phase transformers and the commutating reactors are unimportant because they are relatively small.

In the circuit of my invention which operates with medium voltages in the range between 150 volts and 500 volts, these elements are relatively large. However, my novel circuit does not require an intra-phase transformer which results in a substantial saving.

The inter-phase transformer is not needed because we have six contacts and we are effecting a six phase rectification. Therefore, no transfer is required from two phase to six phase as is previously described in copending application Serial No. 361,670 or in a three phase double wave rectifier as it is used for mercury arc rectifier.

Whereas the copending application Serial No. 361,670 concerns a single phase full wave rectifier used three times in parallel to rectify a three phase input power, the present case concerns a six phase half wave rectification of a three phase full wave input power. Because of this, an inter-phase transformer is not required and the output of the rectifier is directly a six phase rippled D.-C.

Accordingly, a primary object of my invention is to provide a novel six phase half wave rectifier in which three commutating reactors are used, each of which operates twice during the positive and negative half portion of the cycle.

Another object of my invention is to provide a novel mechanical rectifier circuit arrangement which eliminates the necessity for inter-phase transformers.

A still further object of my invention is to provide an arrangement in which all of the cooperating contacts carry current in one direction.

A still further object of my invention is to provide a medium voltage medium current mechanical rectifier which has a minimum number of commutating reactors and eliminates the necessity for an inter-phase circuit.

These and other objects of my invention will be apparent from the following description when taken in connection with the drawings in which:

Figure 1 is a schematic wiring diagram of my novel six phase half wave rectifier for medium voltage medium current rectification.

Figure 2 is a voltage-time current representation of the voltages appearing on the single phase secondary windings of the power transformer used in my invention. The solid line of this figure represents the negative voltage across the one half of one of the single phase secondary windings and the dotted lines represents the voltage occurring across the other half of the same secondary winding.

Figure 3 is a time-current curve representation taken on the same time axis as Figure 2. This figure illustrates the 60° current conduction through the cooperating contacts.

Referring now to Figure 1, the rectifier supply from the three phase input line 10, 11 and 12. The current flows through the three poles 13, 14 and 15 of the circuit breaker to the primary windings 16, 17 and 18 of the main power transformer of the rectifier. As illustrated, the primary windings 16, 17 and 18 may be connected in delta. The secondary windings 20—21, 23—24, 26—27 of the power transformer consists of three independent center tapped windings, each situated on one leg of the three phase power transformer. These windings 20—21, 23—24, 26—27 are not intra-connected.

Winding 20 is a positive winding of a phase A, winding 21 of the negative of phase A and 22 is the center tap of this secondary winding. Winding 23 is the positive winding of phase B, winding 24 the negative winding of phase B and 25 is the center tap. Similarly, 26 and 27, respectively, are the positive and negative windings of phase C and 28 is the center tap. The commutating reactors 29, 30 and 31 are connected to the center taps 22, 25 and 28, respectively.

From the commutating reactors 29, 30, 31, the electrical lines are collected into a common point 32 which is the negative terminal of the rectifier. The terminal windings 20–21, 23–24, 26–27 of the transformer are directly connected to the contacts 33, 34, 35, 36, 37 and 38. These contacts 33 through 38 are actuated by a mechanical linkage from motor 40, as described in copending applications Ser. No. 307,024, filed August 29, 1952, now Patent No. 2,845,592, and Serial No. 307,067, filed August 29, 1952, now Patent No. 2,798,909, and is illustrated as a dot-dash line connection 39 driven by the synchronous motor 40.

The synchronous motor 40 by means of the cam and shaft arrangement indicated by the dot-dash line 39 will close the plurality of contacts in the following sequence: 33—36—37—34—35—38. The motor 40 is energized from the source 10, 11 and 12 and drives both the contacts and generator 44.

The contacts 33 through 38 are connected together in a common point 41 which is the positive terminal of the rectifier which can be connected across a circuit breaker 42 to a D.-C. load 43.

Considering Figures 2 and 3, at the time $t_1$, the voltage $E_A$ is more positive than the neighboring voltages $E_C$ and $E_B$. At this time, the contact associated with the voltage of winding 20, that is contact 34, is closed by the motor 40 and cam-shaft 39. This contact 34 receives an increase in current $I_A$ which will have reached its maximum value at time $t_2$. This current $I_A$ remains approximately constant until the time $t_5$ at which time contact 35 is closed by the synchronous motor 40. The contact 35 being associated with the winding 27 which generates the voltage $E_C$ and a current $I_C$ will start to flow.

The voltage appearing in the closed circuit from contact 34, winding 20, center tap 22, reactor 29, reactor 31, center tap 28, winding 26, to 35 and back to contact 34 is the positive difference of the voltages in windings 20 ($E_A$) and 26 ($E_C$) and has a tendency to increase the current in this close loop in the direction of $-E_C$. This current $I_C$ reaches its maximum value at the time $t_6$ at which time current $I_A$ in contact 34 has subsided to zero. This current $I_A$ also flows through the commutating reactor 29 which therefore at the time $t_6$ unsaturates and goes through its break step.

The contact 34 is now opened by motor 40 for example at the time $t_7$, that is, before the step has completely elapsed at the time $t_8$, without damaging the contact. At the time $t_9$ the contact 38 is closed and a current $I_B$ increases whereas the current $I_C$ in contact 35 decreases. This procedure repeats itself once every cycle. That is, every contact closes once during the cycle and carries the full current for 60°.

The commutating reactors 29, 30 and 31 will carry a current twice during each cycle, each time the current is carried for 60°. The commutating reactor 29 for example carries the current from the time $t_1$ until $t_6$ and again time $t_{13}$ to $t_{18}$ when contact 34 and 33 are closed.

In the interval between time $t_6$ and $t_8$, commutating reactor 29 will produce a break step in current $I_A$ after which its flux must be reversed by a pre-excitation circuit, as shown in copending application Ser. No. 257,901, filed November 23, 1951, now Patent No. 2,797,380, and in United States Pat. No. 2,611,796, issued September 23, 1952, and repeating the same step in the time interval $t_{18}$ to $t_{20}$.

It will be noted that commutating reactors which were used twice during each cycle have been used previously in the so-called three-phase two wave or bridge connection. However, the operation was seriously hampered by the fact that in this connection or in the previous connection the current was carried for 120° leaving only 60° for the step and interval to the next current carrying period.

This new invention permits an interval of 120° between the current carrying interval of the positive phase and the current carrying interval of the negative phase leaving a sufficient time to accomplish perfect commutation and flux reversal for voltage control without interfering with the next current carrying period.

The pre-excitation and flux reversal in the commutating reactors 29, 30, 31 can be accomplished with exactly the same means as have been heretofore used in mechanical rectifiers and described in copending application Ser. No. 257,901, filed November 23, 1951, and in United States Pat. No. 2,611,796, issued September 23, 1952, except that it is to occur at twice the speed and therefore requires a pre-excitation supply frequency which is double the fundamental frequency of the incoming A.-C. system. This double frequency power supply which must be three phase can be provided by the auxiliary A.-C. generator 44 fastened directly on to the drive shaft 39 of the mechanical rectifier with the only requirement that the generator 44 has four poles as compared to the two poles of the drive motor 40. This generator is shown as 44 and is fastened to the extension of the shaft 39 of the synchronous motor 40.

The energization of the pre-excitation windings on the commutating reactors 29, 30 and 31 from the generator 44 is described in my above mentioned copending application.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a mechanical rectifier for converting three phase alternating current into D.-C. power; a transformer having primary windings and secondary windings; said primary windings energized from a three phase A.-C. source; said secondary windings comprising a first, second and third winding; a contact connected to each terminal of said first, second and third windings; said contacts connected to said last mentioned windings also connected to one output terminal; said first, second and third windings having a center tap; a commutating reactor connected to each of said center taps; said commutating reactors connected to said center taps also connected to a second output terminal; said rectifier supplying six phase half wave rectified current to a load electrically connected between said first and second output terminals.

2. In a six phase half wave rectifier transformer having a three phase primary winding and three independent single phase secondary windings; each terminal of said independent secondary windings connected to a different mechanically operated contact; said mechanically operated contacts connected to a positive terminal of the load to receive rectified power from said rectifier; each of said independent secondary windings having a center tap connected to a different commutating reactor; said commutating reactors connected to a negative terminal of said load.

3. In a rectifier having motor driven cooperating contacts; a transformer having primary windings connected for energization from a three phase source and three independent single phase secondary windings; a contact associated with each terminal of said independent secondary windings; mechanical means to alternately close said contacts for a period of 60° during each conducting cycle; a commutating reactor operatively connected to and associated with each of said independent secondary windings; the commutating reactor connected to a center tap of the independent secondary winding having one of its associated contacts in closed position carrying the load current; each of said commutating reactors alternately carrying load current for 60° during each half of the conducting cycle.

4. In a converting device for supplying six phase half wave rectification to a load comprising a first, second and third series of components; each of said series of components comprising a secondary winding; a first and second mechanically operated contact and a commutating reactor; said secondary winding of said first, second and third series of components energized from a common three phase primary winding; said first and second contact, respectively, connected to a first and second terminal of said secondary winding; said commutating reactor connected to a center tap of said secondary winding; said commutating reactor and said first and second contact from said first, second and third series of components electrically connected to each other through a load; said first and second contacts alternately mechanically closed for one-sixth of the conducting cycle.

5. In a converting device for supplying six phase half wave rectification to a load comprising a first, second and third series of components; each of said series of components comprising a secondary winding; a first and second mechanically operated contact and a commutating reactor; said secondary winding of said first, second and third series of components energized from a common three phase primary winding; said first and second contact, respectively, connected to a first and second terminal of said secondary winding; said commutating reactor connected to a center tap of said secondary winding; said commutating reactor and said first and second contacts from said first, second and third series of components electrically connected to each other through a load; said first and second contacts alternately mechanically closed for one-sixth of the conducting cycle; said commutating reactors alternately conducting current for one-third of the conducting cycle.

References Cited in the file of this patent

UNITED STATES PATENTS

| 1,211,380 | Thomas | Jan. 2, 1917 |
| 1,434,346 | Jonas | Oct. 31, 1922 |
| 1,957,229 | Sabbah | May 1, 1934 |
| 2,141,921 | Leukert | Dec. 27, 1938 |
| 2,602,152 | Storsand | July 1, 1952 |

FOREIGN PATENTS

| 612,130 | France | Oct. 18, 1926 |
| 612,131 | France | Oct. 18, 1926 |